(12) United States Patent
Ivanov et al.

(10) Patent No.: US 11,582,502 B2
(45) Date of Patent: Feb. 14, 2023

(54) METHOD AND SYSTEM FOR UPLOADING MEDIA OBJECTS UNTO A WEB PLATFORM

(71) Applicant: YANDEX EUROPE AG, Lucerne (CH)

(72) Inventors: Konstantin Nikolaevich Ivanov, g Moskovskiy (RU); Andrey Vyacheslavovich Tetekin, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 17/200,663

(22) Filed: Mar. 12, 2021

(65) Prior Publication Data
US 2022/0030294 A1  Jan. 27, 2022

(30) Foreign Application Priority Data
Jul. 22, 2020  (RU) ............................ RU2020124305

(51) Int. Cl.
*H04N 21/2743* (2011.01)
*H04N 21/234* (2011.01)

(52) U.S. Cl.
CPC ... *H04N 21/2743* (2013.01); *H04N 21/23418* (2013.01)

(58) Field of Classification Search
CPC ......... H04N 21/2743; H04N 21/23418; H04N 21/44016; H04N 21/435; H04N 21/437; H04N 21/8126; H04N 21/8455; H04N 21/4722; H04N 21/47205; G11B 27/34
See application file for complete search history.

(56) References Cited

U.S. PATENT DOCUMENTS

| | | | |
|---|---|---|---|
| 8,261,231 B1 | 9/2012 | Hirsch et al. | |
| 2007/0130210 A1 | 6/2007 | Park | |
| 2009/0063699 A1 | 3/2009 | Chapweske et al. | |
| 2015/0095460 A1 | 4/2015 | Berger et al. | |
| 2017/0025151 A1* | 1/2017 | Han | G06F 3/0484 |
| 2021/0084368 A1* | 3/2021 | Dabbiru | H04N 21/23418 |

FOREIGN PATENT DOCUMENTS

| | | |
|---|---|---|
| RU | 2658784 C1 | 6/2018 |
| WO | 2017106960 A1 | 6/2017 |

OTHER PUBLICATIONS

Russian Search Report dated Jun. 22, 2022 issued in respect of the counterpart Russian Patent Application No. RU 2020124305.

* cited by examiner

*Primary Examiner* — Alazar Tilahun
(74) *Attorney, Agent, or Firm* — BCF LLP

(57) ABSTRACT

There is disclosed a method and system for uploading media objects unto a web platform, the method executable by a server that hosts the web platform, the server being coupled to an electronic device, the method comprising: acquiring a first media object having a first duration time and a second media object having a second duration time for uploading; queuing for upload the first media object; determining a remaining time available for publishing the second media object, the remaining time corresponding to a difference between a predetermined time limit set by the web platform and the first duration time; in response to the remaining time being below the second duration time, shortening the first media object to reduce the first duration time; in response to the second duration time being below the remaining time, publishing the first media object and the second media object as a merged media object.

18 Claims, 5 Drawing Sheets

METHOD AND SYSTEM FOR UPLOADING MEDIA OBJECTS UNTO A WEB PLATFORM

CROSS-REFERENCE

The present application claims priority to Russian Patent Application No. 2020124305, filed on Jul. 22, 2020, the entirety of which is incorporated herein by reference.

FIELD

The present technology relates to uploading media objects, and more particularly, to uploading media objects unto a web platform.

BACKGROUND

Various global or local communication networks (the Internet, the World Wide Web, local area networks and the like) offer a user a vast amount of information and ability to upload various media objects unto platforms. Examples of platforms unto which a user may upload a media object include Facebook™, YouTube™, Instagram™, Tik Tok™ and Yandex.Video™.

Generally speaking, most if not all of the platforms have specific requirements such as the weight and length of the media object. It is generally possible for a user to meet the weight requirement by compressing the media object during the upload, but there is a need to address the requirement regarding the length of the media object.

There exists media content editing applications which allow a user to edit or combine different media objects in a variety of ways. However, when uploading various media objects onto a social media platform, users may find media content editing applications complicated, tedious or very time consuming to use, to comply with specific requirements of the social media platforms.

International Publication No. WO2017/106960 A1 published on Jun. 29, 2017 and assigned to Mydub Media Corporation and entitled "Methods, Apparatus and Computer-Readable Media for Customized Media Production and Templates Therefor" discloses a media content editing/production application running on a computing device provides a graphical user interface (GUI) for mixing media content. The application allows for a user of the computing device to select a start position within a media track such that upon selection of different such start positions, the media track successively plays in a preview window, each time starting from the most recently selected start position. Once satisfied with the start position, the user may provide a mixing command via the GUI for mixing to a master track. The media track will be mixed to the master track, starting from the most recently selected start position. The master track may be published as an output media file. Multiple media tracks may be mixed and synchronizing. Templates for creating customized, yet uniform media productions are also provided, with different portions of the created media production being assignable to different users.

SUMMARY

Developers of the present technology have appreciated at least one technical problem associated with the prior art approaches.

The present technology relates to uploading media objects unto a social media web platform, and more specifically, to methods and systems for uploading the media objects. As has been alluded above, when uploading media objects, such media objects need to abide to the file size and length (expressed in a pre-determined time interval) requirements of the social media web platform.

Generally speaking, the social media web platform may limit the length of the media objects, such that it does not exceed a maximum requirement and/or exceeds a minimum requirement.

In accordance with a first broad aspect of the present technology, there is disclosed a computer-implemented method for uploading media objects unto a web platform, the method executable by a server that hosts the web platform, the server being communicatively coupled to an electronic device via a communication network, the method comprising: acquiring, by the server, from the user electronic device, a first media object having a first duration time and a second media object having a second duration time for uploading unto the web platform; queuing for upload, by the server, the first media object unto the web platform; determining, by the server, a remaining time available for publishing the second media object, the remaining time corresponding to a difference between a predetermined time limit set by the web platform and the first duration time; in response to the remaining time being below the second duration time, shortening the first media object to reduce the first duration time until the second duration time is below the remaining time; in response to the second duration time being below the remaining time, publishing the first media object and the second media object as a merged media object.

In some non-limiting embodiments of the method, the method further includes prior to uploading the first media object, determining the first duration time to be below the predetermined time limit; in response to determining the first duration time to be below the predetermined time limit, queuing for upload the first media object.

In some non-limiting embodiments of the method, the method further includes in response to determining the first duration time to be above the predetermined time limit, shortening the first duration time to be below the predetermined time limit.

In some non-limiting embodiments of the method, the method further comprising: prior to queuing for upload the first media object, determining if the first duration time is above a minimum length requirement and below a maximum length requirement; in response to the first duration time being below the minimum length requirement, not uploading the first media object; in response to the first duration time being above the maximum length requirement, shortening the first media object to reduce the first duration time until the first duration time is below the maximum length requirement.

In some non-limiting embodiments of the method, shortening the first duration time comprises shortening the first duration time by a predetermined amount of time.

In some non-limiting embodiments of the method, the predetermined amount of time corresponds to two seconds.

In some non-limiting embodiments of the method, the shortening the first duration time comprises: analyzing the first media object to determine one or more sets of frames having a common configuration; removing, one or more frames within each one or more sets of frames that collectively have a duration of two seconds.

In some non-limiting embodiments of the method, the first media object and the second media object are videos.

In some non-limiting embodiments of the method, the method further comprising: acquiring, by the server, from the user electronic device, a third media object having a third duration time for uploading unto the web platform; determining, by the server, a second remaining time available for publishing the third media object, the second remaining time corresponding to a difference between the predetermined time limit and a sum of the reduced first duration time and the second duration time; in response to the second remaining time being below the third duration time, shortening at least one of the first media object and second media object to reduce the first duration time or second duration time until the third duration time is below the remaining time.

In some non-limiting embodiments of the method, shortening the at least one of the first media object and second media object comprises at least one of: further shortening the first duration time by the predetermined amount of time; shortening the second duration time by the predetermined amount of time.

In accordance with another broad aspect of the present technology, there is disclosed a system for uploading media objects unto a web platform, the system comprising a server that hosts the web platform, the server being communicatively coupled to an electronic device via a communication network, the server comprising a processor configured to: acquire, from the user electronic device, a first media object having a first duration time and a second media object having a second duration time for uploading unto the web platform; queue for upload, the first media object unto the web platform; determine, a remaining time available for publishing the second media object, the remaining time corresponding to a difference between a predetermined time limit set by the web platform and the first duration time; in response to the remaining time being below the second duration time, shortening the first media object to reduce the first duration time until the second duration time is below the remaining time; in response to the second duration time being below the remaining time, publishing the first media object and the second media object as a merged media object.

In some non-limiting embodiment of the system, the processor is further configured to: prior to uploading the first media object, determine the first duration time to be below the predetermined time limit; in response to determining the first duration time to be below the predetermined time limit, queue for upload the first media object.

In some non-limiting embodiment of the system, the processor is further configured to: in response to determining the first duration time to be above the predetermined time limit, shortening the first duration time to be below the predetermined time limit.

In some non-limiting embodiment of the system, the processor is further configured to: prior to queuing for upload the first media object, determine if the first duration time is above a minimum length requirement and below a maximum length requirement; in response to the first duration time being below the minimum length requirement, not uploading the first media object; in response to the first duration time being above the maximum length requirement, shortening the first media object to reduce the first duration time until the first duration time is below the maximum length requirement.

In some non-limiting embodiment of the system, shortening the first duration time comprises shortening the first duration time by a predetermined amount of time.

In some non-limiting embodiment of the system, the predetermined amount of time corresponds to two seconds.

In some non-limiting embodiment of the system, to shorten the first duration time, the processor is configured to: analyze the first media object to determine one or more sets of frames having a common configuration; remove, one or more frames within each one or more sets of frames that collectively have a duration of two seconds.

In some non-limiting embodiment of the system, the first media object ad the second media objects are videos.

In some non-limiting embodiment of the system, the processor is further configured to: acquire, from the user electronic device, a third media object having a third duration time for uploading unto the web platform; determine, a second remaining time available for publishing the third media object, the second remaining time corresponding to a difference between the predetermined time limit and a sum of the reduced first duration time and the second duration time; in response to the second remaining time being below the third duration time, shortening at least one of the first media object and second media object to reduce the first duration time or second duration time until the third duration time is below the remaining time.

In some non-limiting embodiment of the system, to shorten the at least one of the first media object and the second media object, the processor is configured to execute at least one of: further shortening the first duration time by the predetermined amount of time; shortening the second duration time by the predetermined amount of time.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other locations where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
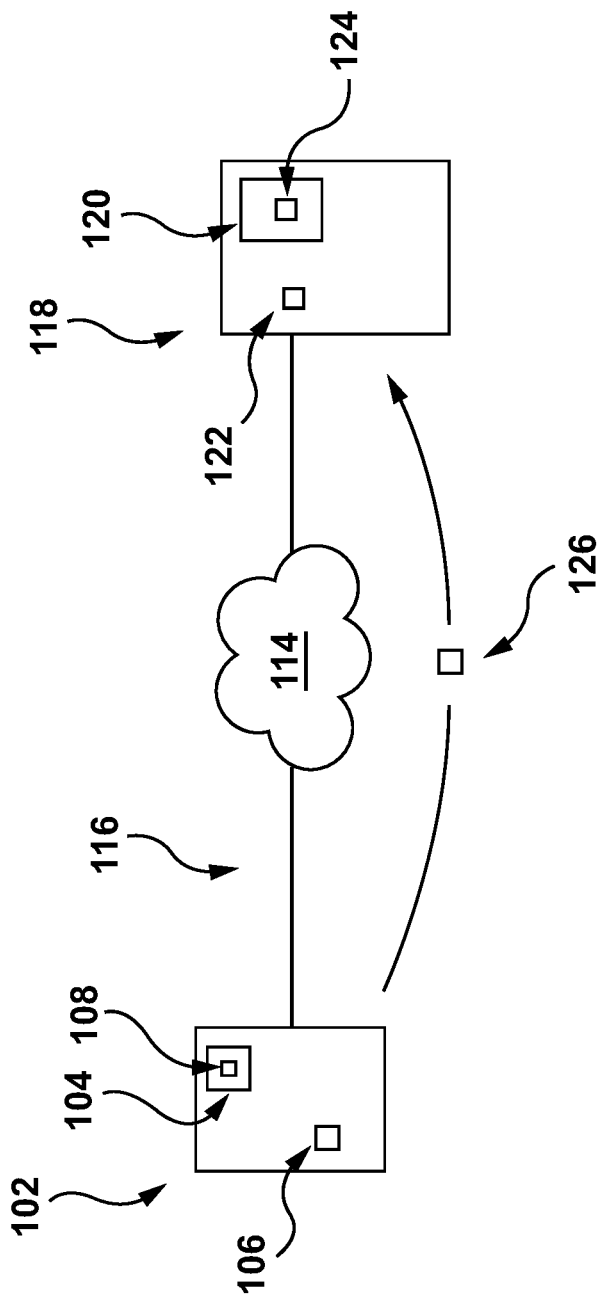
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, the system 100 comprises an electronic device 102. The electronic device 102 is typically associated with a user (not depicted) and, as such, can sometimes be referred to as a "client device".

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art, to execute a social media application 108, such as Instagram™, Yandex Zen™ and the like. Generally speaking, the social media application 108 allows a user to upload media objects (such as videos and photos) unto a platform associated with the social media application 108 using a social media service hosted on a server (described below).

How the social media application 108 is implemented is not particularly limited. One example of the social media application 108 may be embodied in the user (not shown) accessing a web site associated with a social media to access the social media application 108. For example, the social media application 108 can be accessed by typing in a uniform resource locator (URL) associated with Yandex Zen™ social media at zen.yandex.com. It should be expressly understood that the social media application 108 can be accessed using any other commercially available or proprietary social media application.

In alternative non-limiting embodiments of the present technology, the social media application 108 may be implemented as a downloadable application on a portable device (such as a wireless communication device). For example, where the electronic device 102 is an iPhone™ smart phone, the electronic device 102 may download from a digital distribution platform, such as App Store™, the social media application 108 associated with the Yandex Zen' application.

Generally speaking, the electronic device 102 comprises a user input interface (not shown) (such as a keyboard) for receiving user inputs into, for example, the query interface 110. How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

Although only a single electronic device 102 is shown, it should be understood that this is merely for ease of illustration and that the system 100 may include more than one electronic device.

The electronic device 102 is coupled to a communication network 114 via a communication link 116. In some non-limiting embodiments of the present technology, the communication network 114 can be implemented as the Internet. In other embodiments of the present technology, the communication network 114 can be implemented differently, such as any wide-area communications network, local-area communications network, a private communications network and the like.

How the communication link 116 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means, examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 114) via the communication network 114.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments of the present technology, the server 118 can be operated by the same entity that has provided the afore-described social media application 108. For example, the server 118 can be operated by Yandex LLC of Lev Tolstoy Street, No. 16, Moscow, 119021, Russia. In alternative embodiments, the server 118 can be operated by an entity different from the one providing the aforementioned social media application 108.

In some non-limiting embodiments of the present technology, the server 118 provides a social media service 124 (such as Yandex Zen™) which is accessible by the social media application 108 via the communication network 114. The manner in which the social media service 124 is implemented is known in the art and therefore will not be described in detail herein. Suffice to say that the social media service 124 is configured to maintain a web platform on which one or more users can upload and view media objects.

Figure 2:
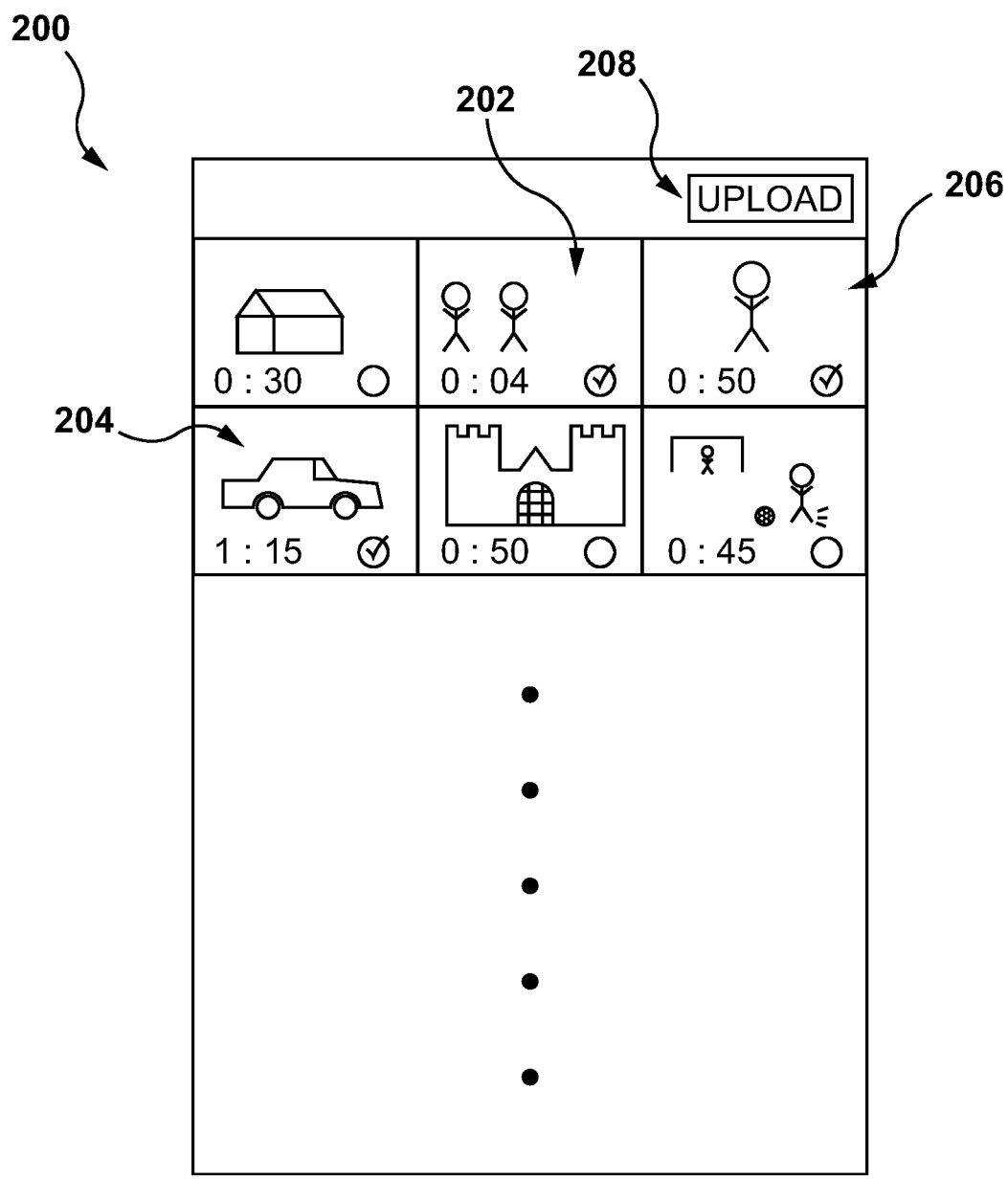
FIG. 2 depicts a schematic illustration of a screenshot of an interface of a social media application of an electronic device for uploading one or more media objects unto the web platform of the social media service of the system of FIG. 1.

With reference to FIG. 2, there is depicted a schematic illustration of a screenshot 200 of an interface of the social media application 108 of the electronic device 102 for uploading one or more media objects unto the web platform of the social media service 124. In the illustrated embodiment, the screenshot 200 discloses 6 media objects (comprising, namely a first media object 202, a second media object 204 and a third media object 206). Needless to say, although 6 media objects are illustrated, this is done for ease of illustration, and it should be understood that more or less than 6 media objects may be displayed by the electronic device 102. In some non-limiting embodiments of the present technology, the first media object 202, the second media object 204 and the third media object 206 are videos. However, in other non-limiting embodiments of the present technology, the first media object 202, the second media object 204 and the third media object 206 can be audio files.

As illustrated, each media object is associated with a duration time. For example, the first media object 202 has a first duration time of 4 seconds, the second media object 204 has a duration time of 1 min 15 seconds, and the third media object 206 has a duration time of 50 seconds.

In some non-limiting embodiments of the present technology, the social media application 108 allows the user associated with the electronic device 102 to select one or more media objects to be published onto the web platform of the social media service 124. For example, let us assume that the user has selected the first media object 202, the second media object 204 and the third media object 206 (illustrated by the checkmark displayed), and clicked a button 208 for uploading the selected media objects onto the web platform. It is contemplated that the user can select the first media object 202, the second media object 204 and the third media object 206 all together at the same time or in sequence (one after another, in a sense "adding" to the totality of media content to be uploaded).

Returning to FIG. 1, in response to the user clicking the button 208, the electronic device 102 is configured to transmit a data packet 126 to the server 118, where the data packet 126 comprises the first media object 202, the second media object 204 and the third media object 206. Needless to say, although a single data packet 126 is illustrated, it should be understood that the each of the first media object 202, the second media object 204 and the third media object 206 may be transmitted separately to the server 118.

Figure 3:
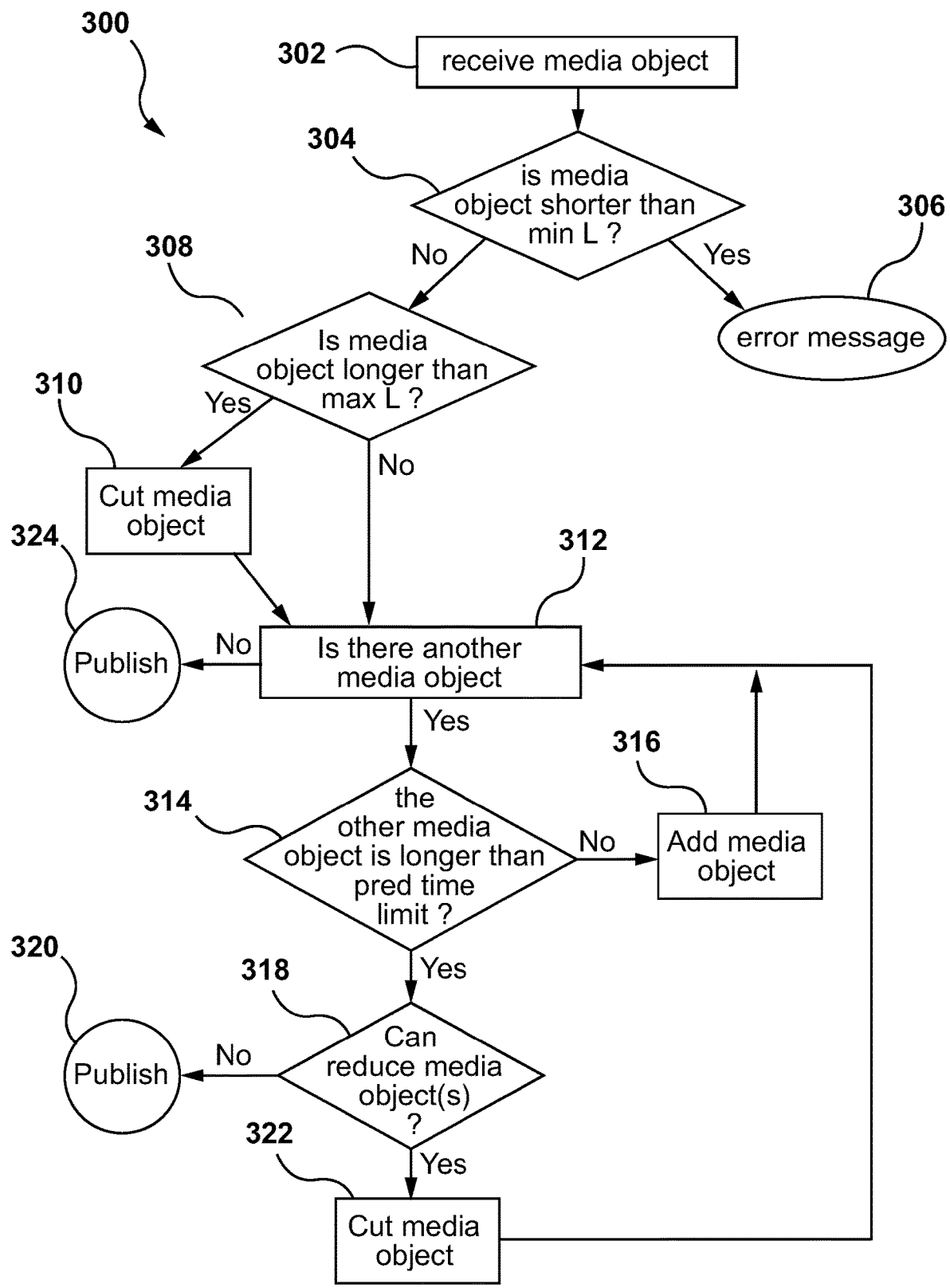
FIG. 3 depicts a schematic diagram of a process for uploading media objects onto the web platform of the social media service of the system of FIG. 1.

With reference to FIG. 3, there is depicted a schematic diagram of a process 300 for uploading media objects onto the web platform of the social media service 124 in response to receiving the data packet 126. The process 300 may be executed by the server processor 122 of the server 118.

The process 300 is executed vis-a-vis each of the first media object 202, the second media object 204 and the third media object 206 in a sequential order. For the purposes of illustration, the explanation of the process 300 will be first made vis-a-vis the first media object 202, then the second media object 204 and finally the third media object 206.

Process 300—First Media Object 202

The process 300 starts at step 302, where the server 118 receives the first media object 202.

At step 304, the server 118 is configured to determine whether the first media object 202 meets a minimum length requirement ("min L"), such as 5 seconds. In other words, a given media object needs to meet the minimum length requirement in order to be published. Needless to say, it is contemplated that the minimum length requirement be more or less than 5 seconds.

Recalling from FIG. 2 that the first media object 202 has a first duration time of 4 seconds (i.e. below the minimum length requirement), the process 300 moves to step 306, where the server 118 is configured to transmit an error message (not illustrated) to the electronic device 102, stating that the first media object 202 does not meet the minimum length requirement, and therefore cannot be published.

The process 300 for the first media object 202 then terminates.

Process 300—Second Media Object 204

Upon the process 300 terminating for the first media object 202, the server 118 runs the process 300 vis-a-vis the second media object 204.

At step 302, the server 118 receives the second media object 204. At step 304, the server 118 determines that the second duration time of the second media object 204, which is 1 minute and 15 seconds long, meets the minimum length requirement. In response, the process 300 moves to step 308.

At step 308, the server 118 is configured to determine whether the second duration time meets a maximum length requirement ("max L"), such as 60 seconds. In other words, a given media object needs to meet the maximum length requirement in order to be published. Needless to say, it is contemplated that the maximum length requirement be more or less than 60 seconds.

Since the second duration time of the second media object 204 is above the maximum length requirement, the process 300 moves to step 310, where the length of the second media object 204 (i.e. the second duration time) is reduced to meet the maximum length requirement.

How the length of the second media object 204 is reduced is not limited. Just as an example, the server 118 may be configured to transmit a data packet (not shown) to the electronic device 102, requesting the user of the electronic device 102 to select a portion of the second media object 204 that meets the maximum length requirement.

Figure 4:
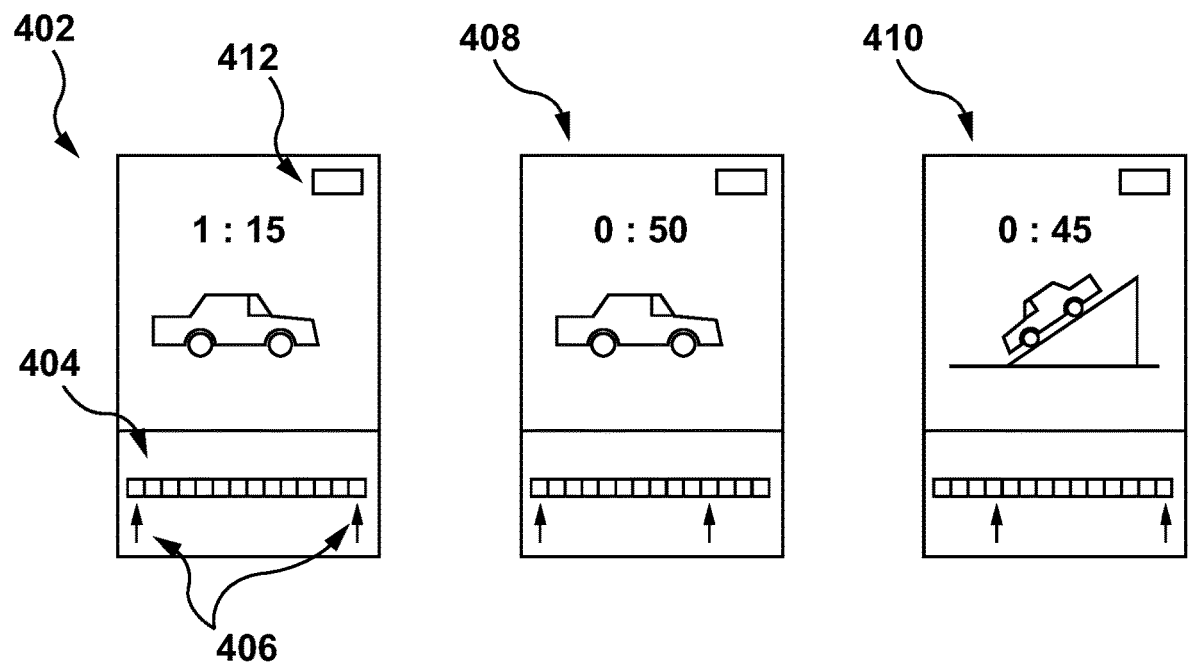
FIG. 4 depicts a schematic illustration of a plurality of screenshots of an interface of the social media application for selecting a portion of the second media object in accordance with a non-limiting embodiment of the present technology.
Figure 5:
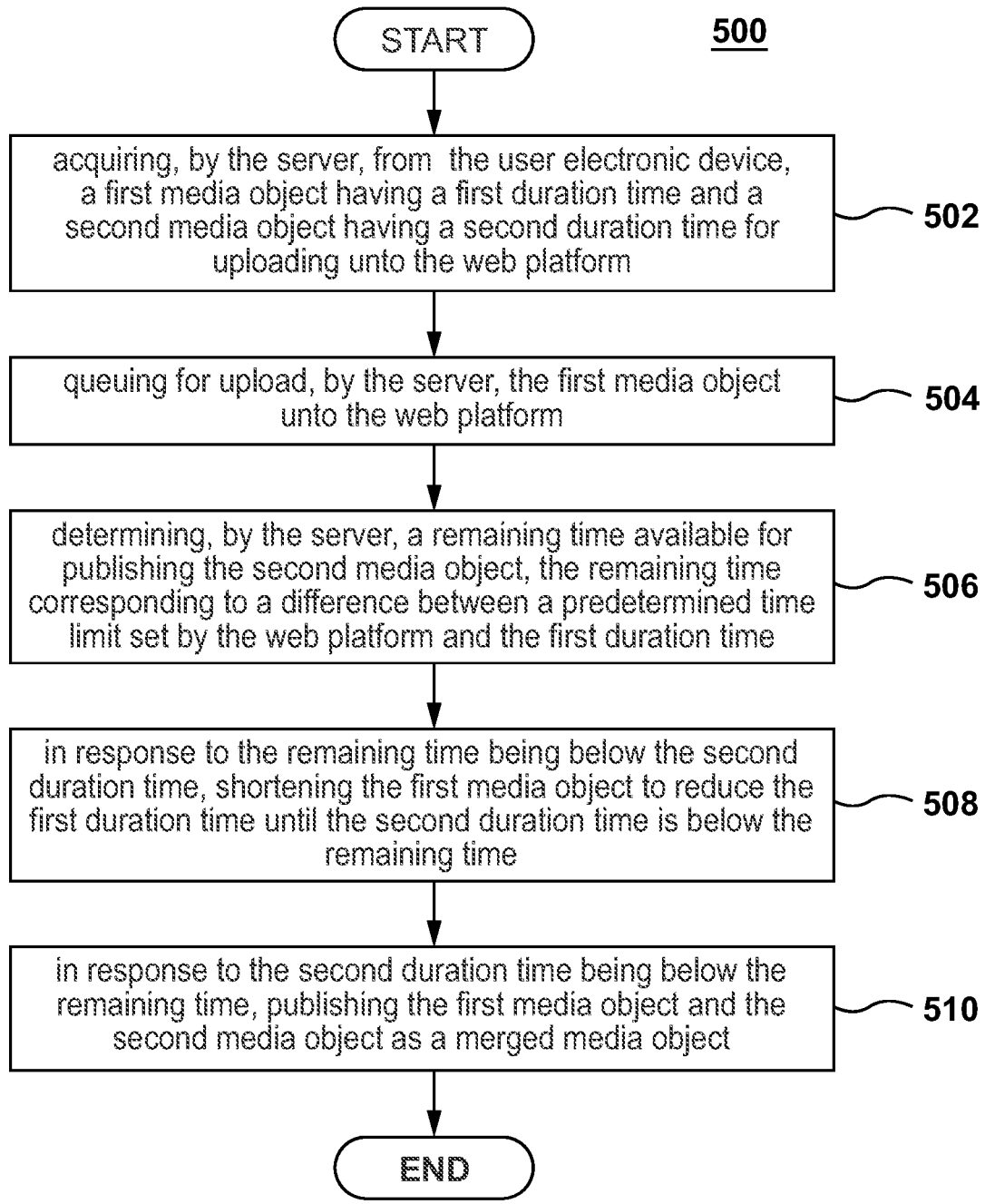
FIG. 5 is a block diagram depicting a flow chart for uploading media objects unto a web platform in accordance with a non-limiting embodiment of the present technology.

Taking a look at FIG. 4, there is depicted a schematic illustration of a plurality of screenshots of an interface of the social media application 108 for selecting a portion of the second media object 204. A first screenshot 402 corresponds to an original second media object 204. The first screenshot 402 illustrates the second duration time of the second media object 204 (1 min 15 seconds), and provides a set of frames 404 making up the second media object 204. The first screenshot 402 further illustrates two sliding scales 406 provided with the frames 404 that the user can interact with, in order to shorten the length of the second media object 204 by defining the start and end frames.

For example, with reference to a second screenshot 408, the user has shortened the second duration time to 50 seconds by ending the second media object 214 prior to its original end. In another example, with the reference to the third screenshot 410, the user has shortened the second duration time to 45 seconds by starting the second media object 214 later than its original start. Following reduction of the second duration time of the second media object 214, the user clicks on an upload button 412 to transfer the shortened second media object 214 to the server 118. Let us assume that the user has shortened the second media object 214 to 45 seconds (as shown in the third screenshot 410).

Returning to FIG. 3, following reception of the reduced second media object 204, the process 300 moves to step 312, where the server 112 determines if any additional media object have been received in addition to the second media object 204. Given that the third media object 206 remains to be processed, the process 300 moves to step 314.

In some non-limiting embodiments of the present technology, prior to moving to step 314, the server 118 is configured to run steps 304 and 308 vis-a-vis the third media object 206. In other words, only if the third media object 206 meets the minimum length requirement and the maximum length requirement (described above), the process 300 moves to step 314.

At step 314, the server 118 is configured to determine whether a total duration time of the reduced second media object 204 and the third media object 206 meets a predetermined time limit, which is set by the social media service 124. In some non-limiting embodiments of the predetermined time limit corresponds to a length limitation of media objects that may be published by the electronic device in a single instance, or in a single time period (such as every hour, every day, etc.). In some non-limiting embodiments of the present technology, the predetermined time limit corresponds to 60 seconds. Needless to say, it is contemplated that the predetermined time limit be more or less than 60 seconds.

Now, recalling that the reduced second media object 204 has a length of 45 seconds, a remaining time that is available for the third media object is 15 seconds (i.e. 45 seconds subtracted from 60 seconds). However, recalling that the third media object 206 has a third duration time of 50 seconds (as illustrated in FIG. 2), the total duration time corresponds to 95 seconds, or 1 min 35 seconds, which exceeds the predetermined time limit by 35 seconds (or the remaining time by 30 seconds).

If, on the other hand, the third media object 206 had a third duration time of 10 seconds, the third duration time would be within the remaining time (as well as the total duration time be within the predetermined time limit) and step 314 would proceed to step 316, where the third media object 206 would be queued for publishing together with the second media object 204.

Given the total duration time being above the predetermined time limit, the process 300 moves to step 318, where the server 118 is configured to determine if it is possible to further reduce the second media object 204.

In some non-limiting embodiments of the present technology, the reduction (or shortening) of the second media object 204 comprises shortening the second duration time of the second media object 204 by a multiple of a predetermined amount of time, such as multiples of 2 seconds. Needless to say, the predetermined amount of time may be more or less than 2 seconds.

How the duration time of the second media object 204 is shortened by the predetermined amount of time is not limited. Just as an example, the server 118 may be configured to analyze the second media object 204 to determine one or more frames having a common configuration (i.e. similar images), and removing one or more frames within each one or more sets of frames to collectively reduce the duration time by the predetermined amount of time at each instance. How the presence of a common configuration between one or more frames are determined is disclosed in U.S. Patent Publication No. 2017/0025151 A1 of LG Electronics Inc., published Jan. 26, 2017 and entitled MOBILE TERMINAL AND CONTROL METHOD FOR THE SAME, the content of which is incorporated by reference herein in its entirety.

In some non-limiting embodiments of the present technology, not only the second media object 204 is reduced, but also, or instead, the third media object 206 is reduced in its duration time in a same manner as described above.

If, for example, none of the second media object 204 and the third media object 206 can be reduced to meet the predetermined time limit, both the second media object 204 and the third media object 206 are published onto the web platform of the social media service 124 at step 320.

If, on the other hand, the second media object 204 and/or the third media object 206 can be reduced to meet the predetermined time limit, the process 300 moves to step 322 and the second media object 204 and/or the third media object 206 are reduced.

The process 300 then returns to step 312, where the server 118 is configured to determine if any other media objects have been transmitted by the electronic device 102.

Given that the data packet 126 (see FIG. 1) did not contain any additional media objects, the process turns to step 324, where the second media object 204 and the third media object 206 are published onto the web platform of the social media service 124 (recalling that the first media object 202 has been refused by the social media service 124 at step 306 for failure to comply with the minimum length requirement).

In some non-limiting embodiments of the present technology, the prior to publishing the second media object 204 and the third media object 206, the social media service 124 may be configured to transmit a data packet (not shown) to the electronic device 102 prompting the user to confirm the upload or to select/transmit any additional media objects to be additionally uploaded.

In the latter situation, the above explained process is iteratively executed for each of the additional media objects. In other words, the total duration time of the media objects is reduced as explained above, to be under the predetermined time limit. For example, assuming a fourth media object (not shown) was added subsequently by the user, the process 300 repeats vis-a-vis the fourth media object.

If the user has confirmed to upload the second media object 204 and the third media object 206, the second media object 204 and the third media object 206 are uploaded as a merged media by the social media service 122. In other words, the second media object 204 and the third media object 206 are published as a back-to-back media object, which does not require the need of a viewing user to interact with the social media application 108 to view the second media object 204 and the third media object 206 separately.

Although in the above example, only three media objects have been included within the data packet 126 (i.e. the first media object 202, the second media object 204 and the third media object 206), it is to be understood that it contemplated that more than three media objects be selected by the user of the electronic device 102.

Finally, although in the above examples, the first media object 202, the second media object 204 and the third media object 206 have been selected by the user and transmitted by the data packet 126 it is not limited as such. It is contemplated that the user selects and upload each media object separately (via a respective data packet), and once processed, the social media service 122 prompts the user to upload or add additional media objects. For example, at step 312 of the second media object 204, the social media service 122 may prompt the user to select or add additional media objects or upload the second media object 204. In response, the user may upload the third media object 206, which will cause the social media service 122 to run the process 300 vis-a-vis the third media object 206.

Given the architecture and examples provided hereinabove, it is possible to execute a computer-implemented method for uploading media objects unto a social media web platform. With reference to FIG. 3, there is depicted a flow chart of a method 500 for uploading media objects unto the social media web platform. The method 500 being executable in accordance with non-limiting embodiments of the present technology. The method 500 can be executed by the server 118.

Step 502: Acquiring, by the Server, from the User Electronic Device, a First Media Object Having a First Duration Time and a Second Media Object Having a Second Duration Time for Uploading Unto the Web Platform Method 500 starts with step 502. At step 502, the server 118 acquires the data packet 126 comprising, inter alia, the second media object 204 and the third media object 206. The second media object 204 has a second duration time (1 min 15 seconds), and the third media object 206 has a third duration time (50 seconds).

Step 504: Queuing for Upload, by the Server, the First Media Object Unto the Web Platform At step 504 the server 118 queues the second media object 204 for publishing unto the web platform of the social media service 124.

In some non-limiting embodiments of the present technology, prior to queuing the second media object 204, the server 118 is configured to determine if the second duration time of the second media object 204 to be above a minimum length requirement, and below a maximum length requirement.

Step 506: Determining, by the Server, a Remaining Time Available for Publishing the Second Media Object, the Remaining Time Corresponding to a Difference Between a Predetermined Time Limit Set by the Web Platform and the First Duration Time At step 506, the server 118 is configured to determine if the remaining time (i.e. the difference between the second duration time and the predetermined time limit) is below or above the third duration time of the third media object 206.

Step 508: In Response to the Remaining Time being Below the Second Duration Time, Shortening the First Media Object to Reduce the First Duration Time Until the Second Duration Time is Below the Remaining Time At step 508, in response to the remaining time being below the third duration time (i.e. the third duration time is larger than the remaining time), the server 118 is configured to reduce the second duration time until the resulting remaining time is above the second duration time.

Step 510: In Response to the Second Duration Time being Below the Remaining Time, Publishing the First Media Object and the Second Media Object as a Merged Media Object At step 510, once the third duration time is below the remaining time, the server 118 is configured to publish the second media object 204 and the third media object 206 as a merged media.

The method 500 then terminates or returns to step 502 in response to receiving additional media objects.

It should be apparent to those skilled in the art that at least some embodiments of the present technology aim to expand a range of technical solutions for addressing a particular technical problem encountered by the conventional method of uploading media objects unto a social media web platform.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting, The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method for uploading media objects unto a web platform, the method executable by a server that hosts the web platform, the server being communicatively coupled to an electronic device via a communication network, the method comprising:
   acquiring, by the server, from the user electronic device, a first media object having a first duration time and a second media object having a second duration time for uploading unto the web platform, the first media object being different from the second media object;
   queuing for upload, by the server, the first media object unto the web platform;
   determining, by the server, a remaining time available for publishing the second media object, the remaining time corresponding to a difference between a predetermined time limit set by the web platform and the first duration time;
   in response to the remaining time being below the second duration time, shortening the first media object to reduce the first duration time until the second duration time is below the remaining time; the shortening comprising:
      analyzing the first media object to determine one or more sets of frames, a given set of frames including two or more frames having a common configuration;
      removing at least one frame from at least one of the one or more sets of frames;
   in response to the second duration time being below the remaining time, publishing the first media object and the second media object as a merged media object, the merged media object displaying the first media object and the second media object in a back-to-back format.

2. The method of claim 1, wherein the method further comprises:
   prior to uploading the first media object, determining the first duration time to be below the predetermined time limit;
   in response to determining the first duration time to be below the predetermined time limit, queuing for upload the first media object.

3. The method of claim 2, wherein the method further comprises:
   in response to determining the first duration time to be above the predetermined time limit, shortening the first duration time to be below the predetermined time limit.

4. The method of claim 1, the method further comprising:
   prior to queuing for upload the first media object, determining if the first duration time is above a minimum length requirement and below a maximum length requirement;
   in response to the first duration time being below the minimum length requirement, not uploading the first media object;
   in response to the first duration time being above the maximum length requirement, shortening the first media object to reduce the first duration time until the first duration time is below the maximum length requirement.

5. The method of claim 1, wherein shortening the first duration time comprises shortening the first duration time by a predetermined amount of time.

6. The method of claim 5, wherein the predetermined amount of time corresponds to two seconds.

7. The method of claim 1, wherein the first media object and the second media object are videos.

8. The method of claim 5, the method further comprising:
   acquiring, by the server, from the user electronic device, a third media object having a third duration time for uploading unto the web platform;
   determining, by the server, a second remaining time available for publishing the third media object, the second remaining time corresponding to a difference between the predetermined time limit and a sum of the reduced first duration time and the second duration time;
   in response to the second remaining time being below the third duration time, shortening at least one of the first media object and second media object to reduce the first duration time or second duration time until the third duration time is below the remaining time.

9. The method of claim 8, wherein shortening the at least one of the first media object and second media object comprises at least one of:
   further shortening the first duration time by the predetermined amount of time;
   shortening the second duration time by the predetermined amount of time.

10. A system for uploading media objects unto a web platform, the system comprising a server that hosts the web platform, the server being communicatively coupled to an electronic device via a communication network, the server comprising a processor configured to:
    acquire, from the user electronic device, a first media object having a first duration time and a second media object having a second duration time for uploading unto the web platform, the first media object being different from the second media object;
    queue for upload, the first media object unto the web platform;
    determine, a remaining time available for publishing the second media object, the remaining time corresponding to a difference between a predetermined time limit set by the web platform and the first duration time;
    in response to the remaining time being below the second duration time, shortening the first media object to reduce the first duration time until the second duration time is below the remaining time; wherein to shorten the first duration time, the processor is configured to:
       analyze the first media object to determine one or more sets of frames, a given set of frames including two or more frames having a common configuration;
       remove at least one frame from at least one of the one or more sets of frames; and
    in response to the second duration time being below the remaining time, publishing the first media object and the second media object as a merged media object, the merged media object displaying the first media object and the second media object in a back-to-back format.

11. The system of claim 10, wherein the processor is further configured to:
    prior to uploading the first media object, determine the first duration time to be below the predetermined time limit;

in response to determining the first duration time to be below the predetermined time limit, queue for upload the first media object.

12. The system of claim 10, wherein the processor is further configured to:
in response to determining the first duration time to be above the predetermined time limit, shortening the first duration time to be below the predetermined time limit.

13. The system of claim 10, wherein the processor is further configured to:
prior to queuing for upload the first media object, determine if the first duration time is above a minimum length requirement and below a maximum length requirement;
in response to the first duration time being below the minimum length requirement, not uploading the first media object;
in response to the first duration time being above the maximum length requirement, shortening the first media object to reduce the first duration time until the first duration time is below the maximum length requirement.

14. The system of claim 10, wherein shortening the first duration time comprises shortening the first duration time by a predetermined amount of time.

15. The system of claim 14, wherein the predetermined amount of time corresponds to two seconds.

16. The system of claim 10, wherein the first media object and the second media object are videos.

17. The system of claim 14, wherein the processor is further configured to:
acquire, from the user electronic device, a third media object having a third duration time for uploading unto the web platform;
determine, a second remaining time available for publishing the third media object, the second remaining time corresponding to a difference between the predetermined time limit and a sum of the reduced first duration time and the second duration time;
in response to the second remaining time being below the third duration time, shortening at least one of the first media object and second media object to reduce the first duration time or second duration time until the third duration time is below the remaining time.

18. The system of claim 17, wherein to shorten the at least one of the first media object and the second media object, the processor is configured to execute at least one of:
further shortening the first duration time by the predetermined amount of time;
shortening the second duration time by the predetermined amount of time.

* * * * *